(12) United States Patent
Fan et al.

(10) Patent No.: US 12,182,201 B2
(45) Date of Patent: Dec. 31, 2024

(54) GRAPH DATA STORAGE METHOD, SYSTEM AND ELECTRONIC DEVICE

(71) Applicant: ZHEJIANG TMALL TECHNOLOGY CO., LTD., Hangzhou (CN)

(72) Inventors: Wenfei Fan, Beijing (CN); Wenyuan Yu, Beijing (CN); Jingbo Xu, Beijing (CN); Xiaojian Luo, Beijing (CN)

(73) Assignee: ZHEJIANG TMALL TECHNOLOGY CO., LTD., Zhejiang (CN)

( * ) Notice: Subject to any disclaimer, the term of this patent is extended or adjusted under 35 U.S.C. 154(b) by 679 days.

(21) Appl. No.: 17/160,172

(22) Filed: Jan. 27, 2021

(65) Prior Publication Data

US 2021/0149960 A1    May 20, 2021

Related U.S. Application Data

(63) Continuation of application No. PCT/CN2018/097516, filed on Jul. 27, 2018.

(51) Int. Cl.
  *G06F 12/06* (2006.01)
  *G06F 12/0813* (2016.01)
  *G06F 16/901* (2019.01)

(52) U.S. Cl.
  CPC ...... *G06F 16/9024* (2019.01); *G06F 12/0813* (2013.01); *G06F 2212/2542* (2013.01)

(58) Field of Classification Search
  CPC ........... G06F 16/9024; G06F 2212/254; G06F 2212/2542

(Continued)

(56) References Cited

U.S. PATENT DOCUMENTS 8,438,364 B2    5/2013   Venkataramani
8,527,497 B2    9/2013   Singh et al.
(Continued)

FOREIGN PATENT DOCUMENTS

CN    103336808 A    10/2013
CN    103345508 B    10/2013
(Continued)

OTHER PUBLICATIONS

Translation of International Search Report mailed Apr. 30, 2019, from corresponding PCT Application No. PCT/CN2018/097516, 2 pages.

(Continued)

*Primary Examiner* — Ilwoo Park
(74) *Attorney, Agent, or Firm* — Lee & Hayes, P.C.

(57) ABSTRACT

A graph data storage method for non-uniform memory access architecture (NUMA) processing system is provided. The processing system includes at least one computing device, each computing device corresponding to multiple memories, and each memory corresponding to multiple processors. The method includes: performing three-level partitioning on graph data to obtain multiple third-level partitions based on a communication mode among computing device(s), memories, and processors; and separately storing graph data of the multiple third-level partitions in NUMA nodes corresponding to the processors. A graph data storage system and an electronic device are further provided.

20 Claims, 5 Drawing Sheets

(58) Field of Classification Search
USPC .................................. 707/798; 711/153, 173
See application file for complete search history.

(56) References Cited

U.S. PATENT DOCUMENTS

| | | |
|---|---|---|
| 10,394,792 B1 | 8/2019 | Dehnert et al. |
| 10,409,782 B2 | 9/2019 | Zhang et al. |
| 10,685,071 B2 | 6/2020 | Patterson |
| 2006/0004851 A1 | 1/2006 | Gold et al. |
| 2011/0161608 A1* | 6/2011 | Bellows .............. G06F 12/0813 710/22 |
| 2011/0161970 A1* | 6/2011 | Bellows ................ G06F 9/4881 718/103 |
| 2011/0252073 A1 | 10/2011 | Pauly |
| 2016/0063037 A1 | 3/2016 | Savkli |
| 2018/0075159 A1 | 3/2018 | Lin et al. |
| 2018/0136842 A1* | 5/2018 | Kim ........................ G06F 3/064 |
| 2018/0157729 A1 | 6/2018 | Lee |
| 2021/0004374 A1* | 1/2021 | Xia ....................... G06F 9/4881 |

FOREIGN PATENT DOCUMENTS

| | | |
|---|---|---|
| CN | 103914556 A | 7/2014 |
| CN | 104780213 A | 7/2015 |
| CN | 104965761 B | 10/2015 |
| CN | 105491117 A | 4/2016 |
| CN | 107957962 A | 4/2018 |

OTHER PUBLICATIONS

Translation of Written Option mailed Apr. 30, 2019, from corresponding PCT Application No. PCT/CN2018/097516, 4 pages.
English Translation of Chinese Office Action for corresponding Chinese application No. CN 201880094016, dated Jul. 8, 2023, 5 pages.
English Translation of Chinese Search Report for corresponding Chinese application No. CN 201880094016, dated Jul. 8, 2023, 1 page.
English Translation of Second Chinese Office Action for corresponding Chinese application No. CN 201880094016, dated Nov. 30, 2023, 4 pages.

* cited by examiner

US 12,182,201 B2

GRAPH DATA STORAGE METHOD, SYSTEM AND ELECTRONIC DEVICE

CROSS REFERENCE TO RELATED PATENT APPLICATIONS

This application claims priority to and is a continuation of PCT Patent Application No. PCT/CN2018/097516 filed on 27 Jul. 2018, and entitled "Graph Data Storage Method, System and Electronic Device," which is hereby incorporated by reference in its entirety.

TECHNICAL FIELD

The present disclosure relates to the field of big data storage technologies, and particularly to graph data storage methods, systems and devices.

BACKGROUND

With the development of information technology and the popularization of the Internet, the amount of data has explosively increased. In particular, the rapid development of social networks in recent years has led to a sharp increase in graph data. Graph data is a type of data stored using graphs as a data structure, which is abstracted into nodes and connections between nodes. In the real world, graph data is widespread and large in volume, such as interpersonal relationship graphs in microblogging, webpage pointing graphs in search engines, geographical information graphs in transportation systems, etc. Analyzing and mining information in graph data is of great significance to work in the fields such as business management, production control, market analysis, engineering design, and scientific exploration, etc. There are a number of existing graph databases, including but not limited to: Neo4j, Arangodb, Orientdb, and other graph databases.

In existing technologies, almost all graph data is currently stored in the same memory. Multiple processors (CPUs) share a physical memory. When each processor works and retrieves data from the memory, the time required therefor is the same, thereby reducing the data access efficiency.

Accordingly, there is an urgent need to design a storage method for graph data to overcome the deficiencies associated with low efficiency of existing graph data access and storage.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a method, a system, and a device for storing graph data to solve the technical problem of low efficiency of graph data access and storage in existing technologies.

The embodiments of the present disclosure provide a graph data storage method for a non-uniform memory access architecture (NUMA) processing system. The processing system includes at least one computing device, each computing device corresponding to multiple memories, and each memory corresponding to multiple processors. The method includes the following steps:

performing three-level partitioning on graph data to obtain multiple third-level partitions based on a communication mode among computing device(s), memories, and processors; and separately storing graph data of the multiple third-level partitions in NUMA nodes corresponding to the processors.

Furthermore, performing the three-level partitioning on the graph data to obtain the multiple third-level partitions based on the communication mode among the computing device(s), the memories, and the processors includes the following steps:

partitioning the graph data according to a number of the computing device(s) and a communication overhead between the computing device(s) to obtain multiple first-level partitions;

dividing each first-level partition into multiple second-level partitions according to a number of NUMA nodes in each computing device and a communication overhead between NUMA nodes; and dividing each second-level partition into a plurality of third-level partitions according to a number of working nodes in each NUMA node and a communication overhead between each working node, the working node including a processor or a thread on the processor.

Furthermore, a specific method of separately storing the graph data of the multiple third-level partitions in the NUMA nodes corresponding to the processors includes:

storing content of a first part of the graph data into the memory by way of three-level partitioning of the graph data, wherein the first part includes a graph structure, data, and context;

storing content of a second part of the graph data into the memory in an interleaved mode, wherein the processor controls from which NUMA node each memory block is allocated, and the content of the second part of the content includes information; and storing content of a third part of the graph data into the memory in an interleaved mode, wherein which NUMA node each memory block is allocated from is controlled according to an access frequency and a load balance, and the content of the third part includes a partition table.

Furthermore, in the interleaved mode, the graph data includes multiple data blocks, and each data block is alternately stored on a different NUMA node.

At the same time, the embodiments of the present disclosure provide a graph data storage system for a non-uniform memory access architecture (NUMA) processing system. The processing system includes at least one computing device, each computing device corresponding to multiple memories, and each memory corresponding to multiple processors. The system includes:

a partition module configured to perform three-level partitioning on graph data to obtain multiple third-level partitions based on a communication mode among computing device(s), memories, and processors; and a storage module configured to separately store graph data of the multiple third-level partitions in NUMA nodes corresponding to the processors.

Further, the partitioning module is further used for:

partitioning the graph data according to a number of the computing device(s) and a communication overhead between the computing device(s) to obtain multiple first-level partitions;

dividing each first-level partition into multiple second-level partitions according to a number of NUMA nodes in each computing device and a communication overhead between NUMA nodes; and dividing each second-level partition into a plurality of third-level partitions according to a number of working nodes in each NUMA node and a communication overhead between each working node, the working node including a processor or a thread on the processor.

Further, the storage module is further used for:

storing content of a first part of the graph data into the memory by way of three-level partitioning of the graph data, wherein the first part includes a graph structure, data, and context;

storing content of a second part of the graph data into the memory in an interleaved mode, wherein the processor controls from which NUMA node each memory block is allocated, and the content of the second part of the content includes information; and storing content of a third part of the graph data into the memory in an interleaved mode, wherein from which NUMA node each memory block is allocated is controlled according to an access frequency and a load balance, and the content of the third part includes a partition table.

Furthermore, the embodiment of the present disclosure also provides an electronic device, which includes: multiple processors and multiple memories, the multiple processors and multiple memories adopt a non-uniform memory access architecture (NUMA) mode.

The memory stores a computer program, and the computer program is executed by the multiple processors, to cause the multiple processors to be enabled to:

perform three-level partitioning on graph data to obtain multiple third-level partitions based on a communication mode among computing device(s), memories, and processors; and separately store graph data of the multiple third-level partitions in NUMA nodes corresponding to the processors.

Furthermore, performing the three-level partitioning on the graph data to obtain the multiple third-level partitions based on the communication mode among the computing device(s), the memories, and the processors includes the following steps:

partitioning the graph data according to a number of the computing device(s) and a communication overhead between the computing device(s) to obtain multiple first-level partitions;

dividing each first-level partition into multiple second-level partitions according to a number of NUMA nodes in each computing device and a communication overhead between NUMA nodes; and dividing each second-level partition into a plurality of third-level partitions according to a number of working nodes in each NUMA node and a communication overhead between each working node, the working node including a processor or a thread on the processor.

Furthermore, a specific method of separately storing the graph data of the multiple third-level partitions in the NUMA nodes corresponding to the processors includes:

storing content of a first part of the graph data into the memory by way of three-level partitioning of the graph data, wherein the first part includes a graph structure, data, and context;

storing content of a second part of the graph data into the memory in an interleaved mode, wherein the processor controls from which NUMA node each memory block is allocated, and the content of the second part of the content includes information; and storing content of a third part of the graph data into the memory in an interleaved mode, where from which NUMA node each memory block is allocated is controlled according to an access frequency and a load balance, and the content of the third part includes a partition table.

The graph data storage method, system and electronic device provided by the embodiments of the present disclosure have at least the following beneficial effects:

Combined with a non-uniform memory access architecture (NUMA), graph data is stored, the graph data is partitioned during a storage process. Related graph data is selected to be stored in a same partition, so that a processor can quickly obtain desired when data accessing a memory, thereby improving the efficiency of data accesses.

BRIEF DESCRIPTION OF THE DRAWINGS

In order to more clearly describe technical solutions in the embodiments of the present disclosure, accompanying drawings that are needed for describing the embodiments are briefly described hereinafter. Apparently, the drawings in the following description represent only some embodiments of the present disclosure. For one of ordinary skill in the art, other drawings can be obtained from these drawings without making any creative effort.

DETAILED DESCRIPTION

In order to make the objectives, technical solutions and advantages of the present disclosure clearer, the present disclosure will be further described in detail hereinafter in conjunction with the accompanying drawings. Apparently, the described embodiments represent only a part and not all of the embodiments of the present disclosure. Based on the embodiments of the present disclosure, all other embodiments obtained by one of ordinary skill in the art without making any creative effort shall fall within the scope of protection of the present disclosure.

The graph data processing method, system, and electronic device provided in the embodiments of the present disclosure combine an architecture mode of non-uniform memory access architecture (NUMA) to store graph data, thereby improving the efficiency of user accesses to data. The concepts of graph data, non-uniform memory access architecture (NUMA), memory, and processor are briefly described hereinafter.

A graph database uses graphs to store data, and is one of the closest high-performance data structure methods for storing data. A graph includes a plurality of nodes and relationships. Relationships between nodes are a very important part of the graph database. A number of pieces of related data can be found through relationships, such as node collections, relationship collections, and attribute collections thereof.

Each computing device corresponds to multiple memories, and each memory corresponds to multiple processors (CPUs). This type of communication connection mode constitutes a non-uniform memory access architecture (NUMA) mode. The non-uniform memory access architecture (NUMA) mode is a distributed memory access mode. A processor can access different memory addresses at the same time, which greatly improves parallelism. Under the NUMA architecture, processors are divided into multiple nodes, and each node is allocated with a local memory space. The processors in all the nodes can access all physical memories of a system, but the time required to access a memory in a local node is much less than the time spent in accessing memories in some remote nodes.

Figure 4:
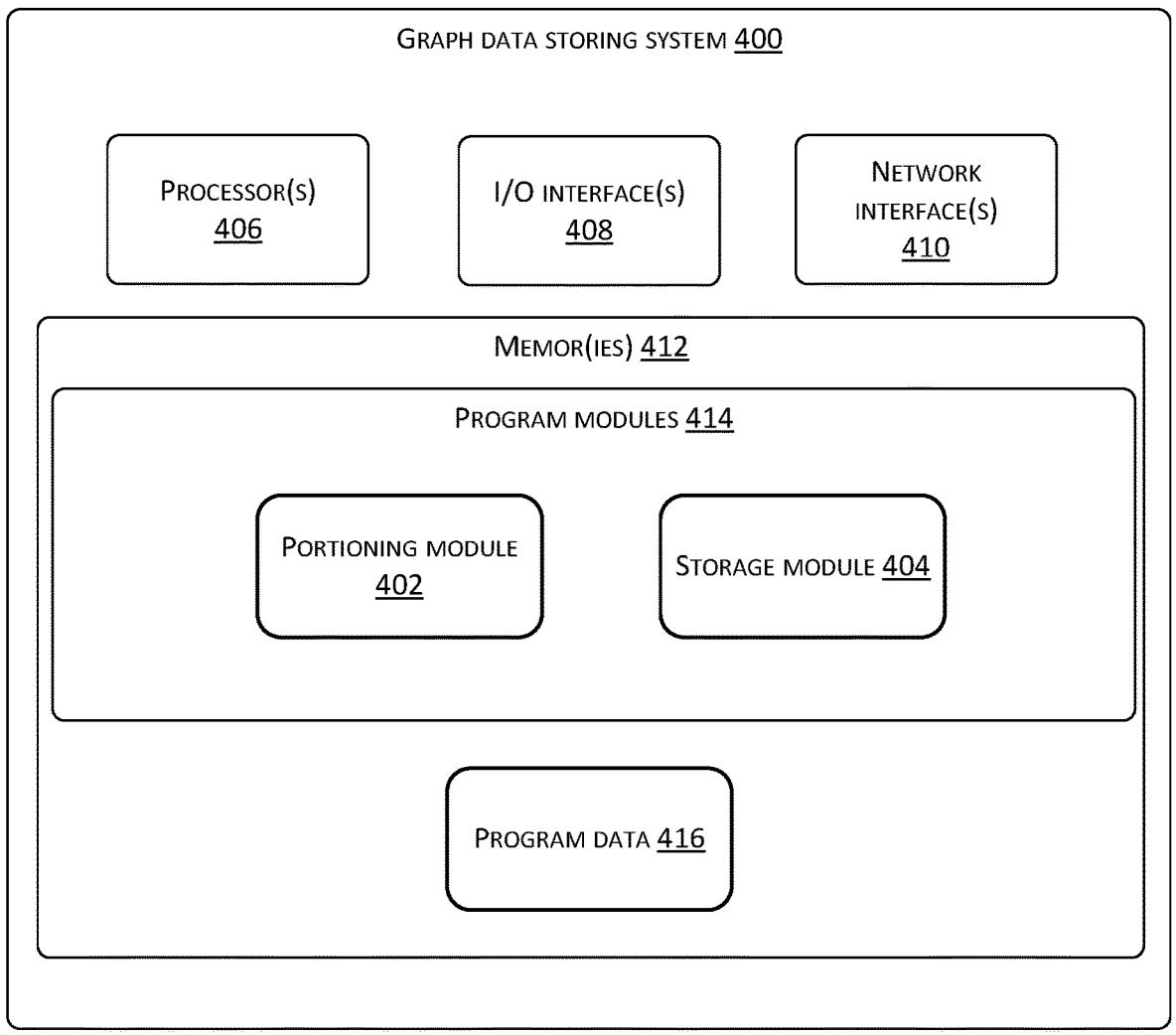
FIG. 4 is a schematic diagram of a structure of a graph data storage system according to the embodiments of the present disclosure.

As a non-volatile computer-readable storage medium, a memory can be used to store non-volatile software programs, non-volatile computer executable programs and modules, such as corresponding program instructions/modules in the graph data storage methods in the embodiments of the present application (for example, a partition module and a storage module as shown in FIG. 4). A memory may include a program storage region and a data storage region. The program storage region may store an operating system and an application program required by at least one function. The data storage region may store image data, etc. In addition, the memory may include a high-speed random access memory, and may also include a non-volatile memory, such as at least one magnetic disk storage device, a flash memory device, or other non-volatile solid-state storage devices.

The processor executes various functional applications and data processing of a server by running non-volatile software programs, instructions, and modules stored in the memory, i.e., implementing the data storage methods in the above method embodiments.

The solutions of the present disclosure will be further described in detail hereinafter through specific embodiments in conjunction with the accompanying drawings of the present specification.

Figure 1:
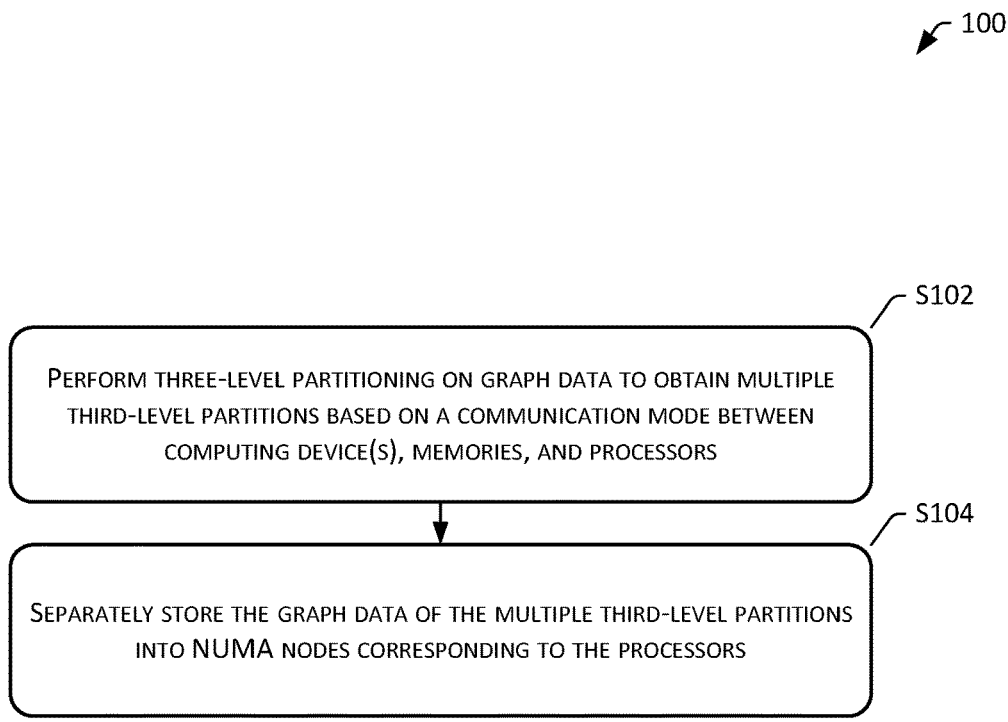
FIG. 1 is a flowchart of a method for storing graph data according to the embodiments of the present disclosure.

The embodiments of the present disclosure provide a method 100 for storing graph data. As shown in FIG. 1, a processing system for non-uniform memory access architecture (NUMA) includes at least one computing device. Each computing device includes multiple memories, and each memory corresponds to multiple processors. The method 100 may include the following steps:

S102: Perform three-level partitioning on graph data to obtain multiple third-level partitions based on a communication mode between computing device(s), memories, and processors.

S104: Separately store the graph data of the multiple third-level partitions into NUMA nodes corresponding to the processors.

In step S102, the partitioning of the graph data is implemented using a partitioning algorithm, such as METIS. The partitioning algorithm can follow principles, such as ensuring the least number of cross-partition edges, the least number of cross-partition points, etc.

The computing device is any electronic device with processing capabilities, such as a computer, a mobile phone, a tablet computer, etc. Preferably, the computing device has multiple NUMA nodes.

Figure 2:
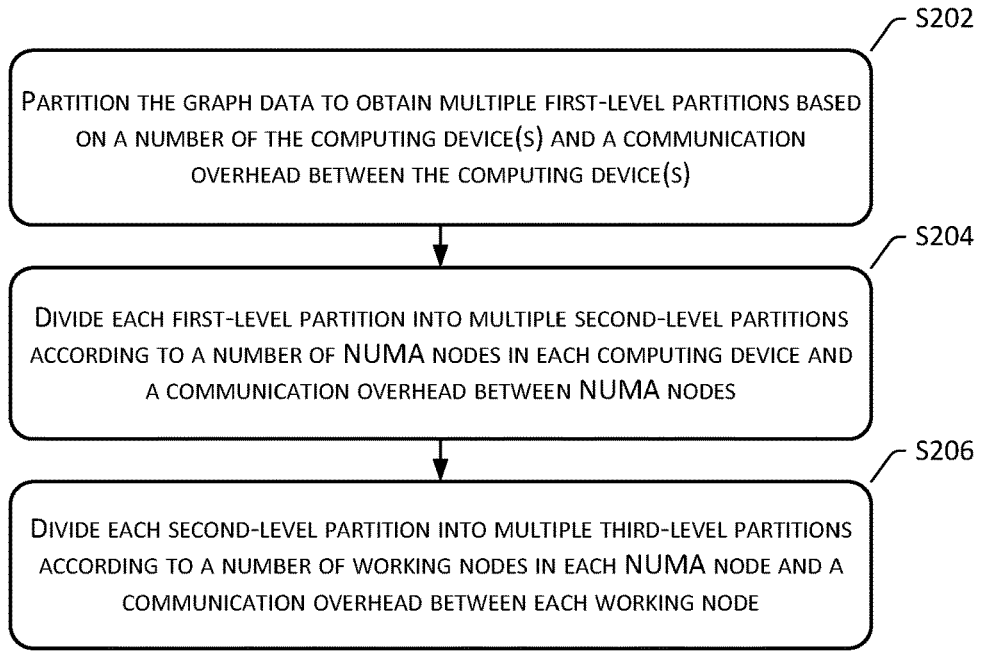
FIG. 2 is a flow chart of a method for three-level partitioning of graph data in the embodiments of the present disclosure.

Based on the communication mode between the computing device(s), the memories, and the processors, a specific method 200 of performing three-level partitioning on the graph data, as shown in FIG. 2, includes the following steps:

S202: Partition the graph data to obtain multiple first-level partitions based on a number of the computing device(s) and a communication overhead between the computing device(s).

In implementations, the number of the computing device(s) is two. Considering the communication overhead between these two computing devices, the graph data is divided into two first-level partitions.

S204: Divide each first-level partition into multiple second-level partitions according to a number of NUMA nodes in each computing device and a communication overhead between NUMA nodes.

The number of NUMA nodes in each computing device is the same as the number of the memories. In the present embodiment, each computing device includes two NUMA nodes. Considering a communication overhead between these two NUMA nodes, data in each first-level partition is divided into two second-level partitions, i.e., a total of four second-level partitions.

S206: Divide each second-level partition into multiple third-level partitions according to a number of working nodes in each NUMA node and a communication overhead between each working node.

The working node refers to a processor or a thread running on the processor. Data in each third-level partition formed by final partitioning is data that is most relevant to each other. Relevance between data of multiple third-level partitions is less than relevance between data in a same partition. Some data that exists respectively in two adjacent partitions is relevant to each other.

In implementations, each NUMA node is connected to two CPUs, and data in each second-level partition is divided into two third-level partitions, i.e., a total of eight third-level partitions. Each third-level partition corresponds to a processor.

In step S104, after partitioning the graph data, according to working nodes in a NUMA node, the graph data of the multiple third-level partitions are separately stored in corresponding NUMA nodes. In an absence of dynamic binding, this can be considered as a partition to be bound to a fixed CPU, and thus bound to a fixed NUMA node. It can be understood that a memory corresponding to each working node stores graph data of a third-level partition.

Figure 3:
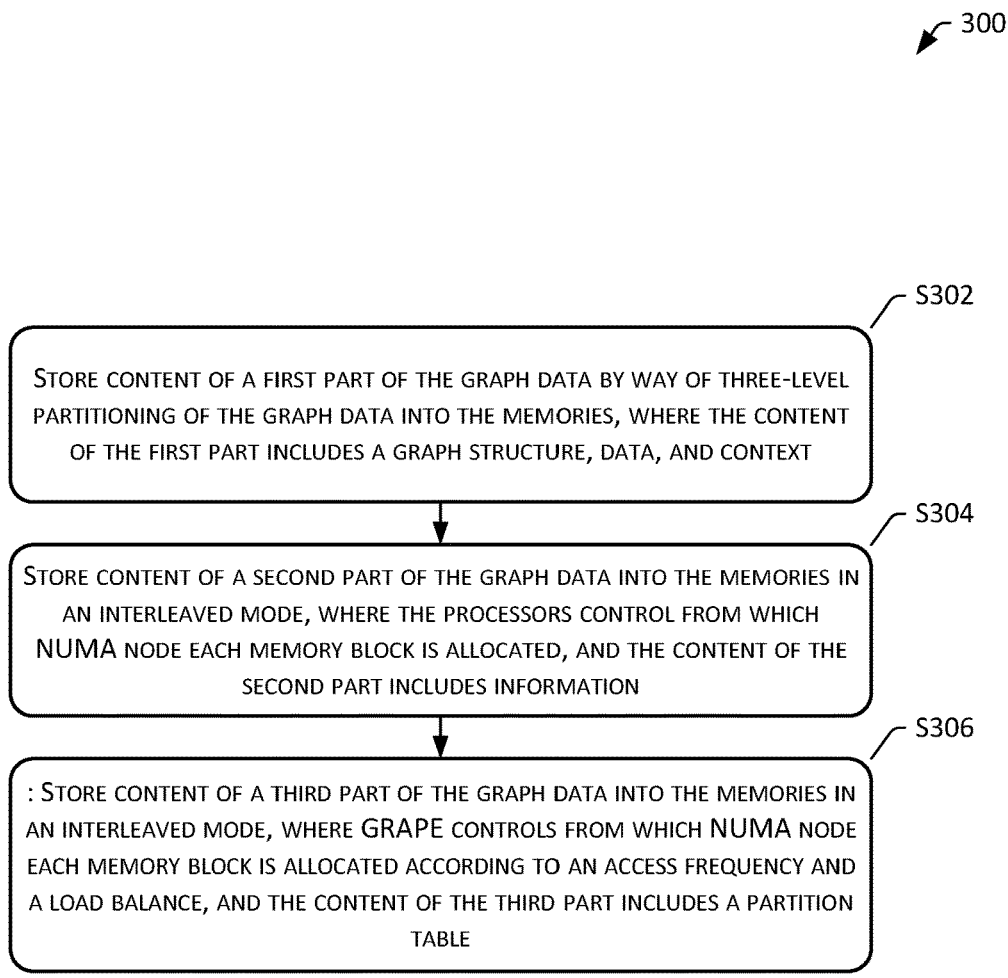
FIG. 3 is a flowchart of a method for storing graph data of a third-level partition in the embodiments of the present disclosure.

Since the graph data includes three parts (a first part includes a graph structure, data, and context; a second part includes information; and a third part includes a partition table (partition)), the process of storing the graph data not only stores data, but also needs to store the content of each part. However, the ways of storing the content of each part can be different. Specifically, a specific method 300 of storing the graph data of the multiple third-level partitions into corresponding NUMA nodes, as shown in FIG. 3, includes:

S302: Store content of a first part of the graph data by way of three-level partitioning of the graph data into the memories, where the content of the first part includes a graph structure, data, and context.

S304: Store content of a second part of the graph data into the memories in an interleaved mode, where the processors control from which NUMA node each memory block is allocated, and the content of the second part includes information.

S306: Store content of a third part of the graph data into the memories in an interleaved mode, where from which NUMA node each memory block is allocated is controlled according to an access frequency and a load balance, and the content of the third part includes a partition table.

In step S202, such content of the first part as the graph structure, the data, and the context can be partitioned by way of three-level partitioning of the graph data, and content of multiple third-level partitions that are obtained are separately stored in corresponding NUMA nodes. Details of the three-level partitioning can be referenced to the above content.

In step S204, the interleaved mode means that the graph data is divided into multiple data blocks, and each data block is alternately stored on a different NUMA node. For example, for a large segment of contiguous memory, first, memory allocation has the smallest block, and a page is the smallest block. If 16384 bytes of memory space is requested to store the information, a page size is 4096 bytes, and there are 2 NUMA nodes (node 1 and node 2), information data of 1~4096 bytes is then allocated from NUMA node 1, information data of 4097~8192 bytes is allocated from NUMA node 2, and the rest of the information data is continuously alternately allocated from NUMA node 1 and NUMA node 2. In this interleaved mode, an operating system controls from which NUMA node each page is allocated.

The information refers to information notified to each other when different partitions need to synchronize state information. It is because a dividing edge belongs to two partitions if graph data is divided into graphs using edge division. When any one of the two partitions updates a state of the edge, the other partition needs to be notified to perform an update, to ensure global consistency.

In step S206, although the content of the third part is stored in an interleaved mode, this is different from the interleaved mode used for the content of the second part. The content of the third part is precisely controlled by a graph computing engine, such as a GRAPE scheduler, according to an access frequency and a load balance (balancing). The graph computing engine needs to control which NUMA node each memory block comes from to achieve interleaved storing.

The partition table refers to a mapping table of partition(s) corresponding to each working node. The partition table or shared data between partitions is often used when calculating partitions, and different parts of the partition table have different association conditions with each partition. For example, the first 100 pages of the partition table are frequently used by a first partition. In this case, the first 100 pages of the partition table and the first partition belong to a same NUMA node.

The graph data storage method provided by the embodiments of the present disclosure combines a non-uniform memory access architecture mode to partition graph data and store different pieces of content in the graph data in different ways, thereby improving the efficiency data accesses by users.

As shown in FIG. 4, the embodiments of the present disclosure provide a graph data storage system 400 for a non-uniform memory access architecture (NUMA) processing system. The processing system 400 includes at least one computing device, and each computing device corresponds to multiple memories. Each memory corresponds to multiple processors. The system may 400 may include:

a partitioning module 402 configured to perform a three-level partitioning on graph data based on a communication mode between computing device(s), memories, and processors to obtain multiple third-level partitions; and a storage module 404 configured to separately store the graph data of the multiple third-level partitions into NUMA nodes corresponding to the processors.

The partitioning module 402 uses a partition algorithm, for example, METIS, to partition the graph data. The partitioning algorithm can follow principles such as ensuring the least number of cross-partition edges, the least number of cross-partition points, etc.

Performing the three-level partitioning on the graph data based on the communication mode between the computing device(s), the memories, and the processors by the partitioning module 402 may includes the following steps:

The graph data to obtain the multiple first-level partitions is partitioned based on a number of the computing device(s) and a communication overhead between the computing device(s). In the present embodiment, the number of the computing device(s) is two. Considering a communication overhead between these two computing devices, the graph data is divided into two first-level partitions.

Each first-level partition is divided into multiple second-level partitions according to a number of NUMA nodes in each computing device and a communication overhead between the NUMA nodes. The number of NUMA nodes in each computing device is the same as the number of memories. In the present embodiment, each computing device includes two NUMA nodes. Considering a communication overhead between these two NUMA nodes, data in each first-level partition is divided into two second-level partitions, i.e., a total of four second-level partitions.

Each second-level partition is divided into a plurality of third-level partitions according to a number of working nodes in each NUMA node and a communication overhead between each working node. The working node refers to a processor or a thread running on a processor. Data in each third-level partition formed by final partitioning is data that is most relevant to each other. Relevance between data of multiple third-level partitions is less than relevance between data in a same partition. Some data that exists respectively in two adjacent partitions is relevant to each other. In the present embodiment, each NUMA node has two CPUs, and data in each second-level partition is divided into two third-level partitions, i.e., a total of eight third-level partitions.

The computing device is any electronic device with processing capabilities, such as a computer, a mobile phone, a tablet computer, etc. Preferably, the computing device possesses multiple NUMA nodes.

The storage module 404 stores the graph data of the multiple third-level partitions into corresponding NUMA nodes according to working nodes in the NUMA nodes. In an absence of dynamic binding, this can be considered as a partition to be bound to a fixed CPU, and thus bound to a fixed NUMA node. It can be understood that a memory corresponding to each working node stores graph data of a third-level partition.

Since the graph data includes three parts (a first part includes a graph structure, data, and context; a second part includes information; and a third part includes a partition table (partition)). Therefore, in a process of storing the graph data, the storage module 21 not only stores the data, but also needs to store the content of each part. However, the ways of storing the content of each part may be different. Specifically, separately storing the graph data of the multiple third-level partitions into the NUMA nodes corresponding to the processors by the storage module, specifically includes:

Content of a first part of the graph data is stored in the memories using a three-level partitioning method for the graph data, where the content of the first part includes a graph structure, data, and context. The content of the first part can be partitioned using a three-level partitioning method for the graph data, and pieces of content of multiple third-level partition that are obtained are separately stored in respective NUMA nodes of corresponding processors. Details of the three-level partitioning method can be referenced to the above content.

Content of a second part of the graph data is stored in the memories in an interleaved mode, wherein the processors control from which NUMA node each memory block is allocated, and the content of the second part includes information. The interleaved mode means that the graph data is divided into multiple data blocks, and each data block is alternately stored on a different NUMA node. For example, for a large segment of contiguous memory, memory allocation has the smallest block. A page is assumed to be the smallest block. For example, an interleaved mode (interleave) is used to store the content of the second part. If 16384 bytes of memory space is requested for storing the information, a page size is 4096 bytes, and there are 2 NUMA nodes (node 1 and node 2), information of 1~4096 bytes is allocated from NUMA node 1, and information of 4097~8192 bytes is allocated from NUMA node 2. Each memory block stores third-level partitions of graph data on different NUMA nodes.

The information refers to information notified to each other when different partitions need to synchronously update state information. It is because a dividing edge belongs to two partitions if a graph is divided using edge division. When any one of the two partitions updates a state of the edge, the other partition needs to be notified to perform an update, to ensure global consistency.

The content of the third part of the graph data is also stored in the memory in an interleaved mode, where a graph computing engine controls from which NUMA node each memory block is allocated according to an access frequency and a load balance, and the content of the third part includes a partition table. Although interleaved modes are used for storing the third part and the second part, these two interleaved modes are different.

The partition table refers to a mapping table of partition(s) corresponding to each working node. The partition table or shared data between partitions is often used when calculating partitions, and different parts of the partition table have different association conditions with each partition. For example, the first 100 pages of the partition table are frequently used by a first partition. In this case, the first 100 pages of the partition table and the first partition belong to a same NUMA node.

The graph data storage system provided by the embodiments of the present disclosure combines a non-uniform memory access architecture mode to partition graph data and store different pieces of content in the graph data in different ways, thereby improving the efficiency data accesses by users.

In implementations, the system 400 may further include one or more processors 406, one or more input/output (I/O) interfaces 408, one or more network interfaces 410, and one or more memories 412.

The one or more memories 412 may include a form of computer readable media such as a volatile memory, a random access memory (RAM) and/or a non-volatile memory, for example, a read-only memory (ROM) or a flash RAM. The one or more memories 412 are an example of a computer readable media. In implementations, the one or more memories 412 may include program modules 414 and program data 416. The program modules 414 may include the partitioning module 402 and the storage module 404 as described in the foregoing description and FIG. 4.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 5:
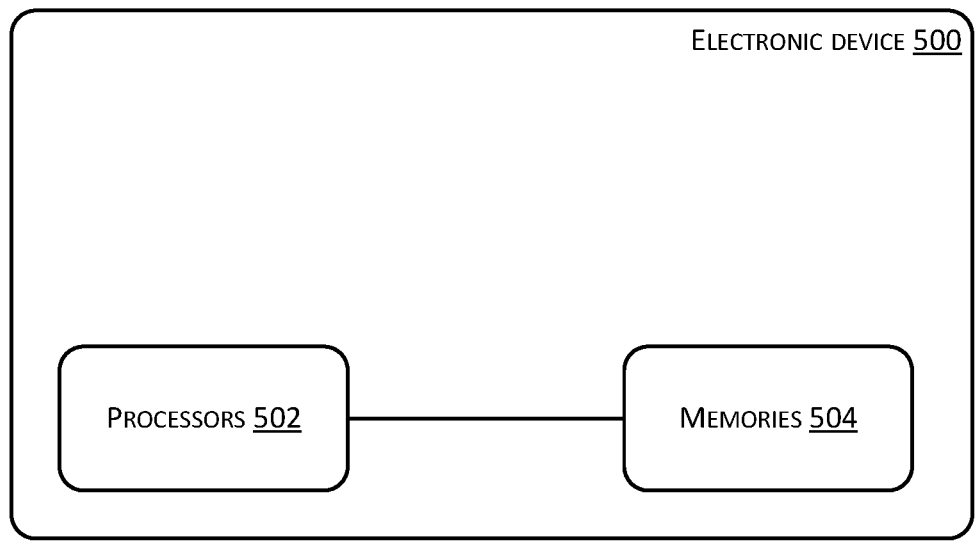
FIG. 5 is a schematic diagram of a structure of an electronic device according to the embodiments of the present disclosure.

As shown in FIG. 5, the embodiments of the present disclosure provide an electronic device 500, which includes: multiple processors 502 and multiple memories 504, the multiple processors 502 and multiple memories 504 adopt a non-uniform memory access architecture (NUMA) mode.

The memory stores a computer program, and the computer program is executed by the multiple processors, to cause the multiple processors to be enabled to:

perform three-level partitioning on graph data to obtain multiple third-level partitions based on a communication mode among computing device(s), memories, and processors; and separately store graph data of the multiple third-level partitions in NUMA nodes corresponding to the processors.

Performing the three-level partitioning on the graph data to obtain the multiple third-level partitions based on the communication mode among the computing device(s), the memories, and the processors includes the following steps:

partitioning the graph data according to a number of computing device(s) and a communication overhead between the computing device(s) to obtain multiple first-level partitions;

dividing each first-level partition into multiple second-level partitions according to a number of NUMA nodes in each computing device and a communication overhead between NUMA nodes; and dividing each second-level partition into a plurality of third-level partitions according to a number of working nodes in each NUMA node and a communication overhead between each working node, the working node including a processor or a thread on the processor.

Separately storing the graph data of the multiple third-level partitions in the NUMA nodes corresponding to the processors includes:

storing content of a first part of the graph data into the memory by way of three-level partitioning of the graph data, wherein the first part includes a graph structure, data, and context;

storing content of a second part of the graph data into the memory in an interleaved mode, wherein the processor controls from which NUMA node each memory block is allocated, and the content of the second part of the content includes information; and storing content of a third part of the graph data into the memory in an interleaved mode, where from which NUMA node each memory block is allocated is controlled according to an access frequency and a load balance, and the content of the third part includes a partition table.

The electronic device of the embodiments of the present disclosure exists in various forms, which include but are not limited to:

(1) Mobile communication device: This type of devices is characterized by mobile communication functions, with main goals as providing voice and data communications. This type of terminals includes: a smart phone (such as iPhone), a multimedia phone, a functional phone, and a low-end phone.

(2) Ultra-mobile personal computer device: This type of device belongs to a category of personal computers, having computing and processing functions, and generally having mobile networking features. This type of terminals include: PDA, MID, and UMPC devices, such as iPad.

(3) Portable entertainment device: This type of device is capable of displaying and playing multimedia content. This type of devices include: an audio player, a video player (such as iPod), a handheld game console, an e-book, a smart toy, and a portable car navigation device.

(4) Server, personal computer, and cloud service computing node: A device that provides computing services. A server is composed of a processor, a hard disk, a memory, a system bus, etc. The server is similar to a general computer architecture, and has relatively high requirements in terms of processing power, stability, reliability, security, scalability, and manageability due to the needs of providing highly reliable services.

The apparatus embodiments described above are merely illustrative. The units described as separate components may or may not be physically separated. The components displayed as units may or may not be physical units, i.e., may be located in one place, or may be distributed among multiple network units. Some or all of the modules may be selected according to actual needs to achieve the objectives of the solutions of the embodiments.

Finally, it should be noted that the above embodiments are only used to illustrate the technical solutions of the present disclosure, and do not impose any limitations thereon. Although the present disclosure has been described in detail with reference to the foregoing embodiments, one of ordinary skill in the art should understand that: the technical solutions recorded in the foregoing embodiments can be modified, or some of the technical features thereof can be equivalently replaced. These modifications or replacements do not cause the essences of the corresponding technical solutions to deviate from the spirit and scope of the technical solutions of the embodiments of the present disclosure.

The present disclosure may further be understood using the following clauses.

Clause 1: A graph data storage method, which is used for a non-uniform memory access architecture (NUMA) processing system, wherein the processing system comprises at least one computing device, each computing device corresponds to multiple memories, each memory corresponds to multiple processors, and the method comprises: performing three-level partitioning on graph data to obtain multiple third-level partitions based on a communication mode among computing device(s), memories, and processors; and separately storing graph data of the multiple third-level partitions in NUMA nodes corresponding to the processors.

Clause 2: The graph data storage method recited in Clause 1, wherein performing the three-level partitioning on the graph data to obtain the multiple third-level partitions based on the communication mode among the computing device(s), the memories, and the processors comprises the following steps: partitioning the graph data according to a number of the computing device(s) and a communication overhead between the computing device(s) to obtain multiple first-level partitions; dividing each first-level partition into multiple second-level partitions according to a number of NUMA nodes in each computing device and a communication overhead between NUMA nodes; and dividing each second-level partition into a plurality of third-level partitions according to a number of working nodes in each NUMA node and a communication overhead between each working node, the working node including a processor or a thread on the processor.

Clause 3: The graph data storage method recited in Clause 1, wherein a specific method of separately storing the graph data of the multiple third-level partitions in the NUMA nodes corresponding to the processors comprises: storing content of a first part of the graph data into the memory by way of three-level partitioning of the graph data, wherein the first part includes a graph structure, data, and context; storing content of a second part of the graph data into the memory in an interleaved mode, wherein the processor controls from which NUMA node each memory block is allocated, and the content of the second part of the content includes information; and storing content of a third part of the graph data into the memory in an interleaved mode, where GRAPE controls from which NUMA node each memory block is allocated according to an access frequency and a load balance, and the content of the third part includes a partition table.

Clause 4: The graph data storage method recited in Clause 1, wherein in the interleaved mode, the graph data comprises multiple data blocks, and each data block is alternately stored on a different NUMA node.

Clause 5: A graph data storage system, which is used for a non-uniform memory access architecture (NUMA) processing system, wherein the processing system includes at least one computing device, each computing device corresponds to multiple memories, each memory corresponds to multiple processors, and the system comprises: a partition module configured to perform three-level partitioning on graph data to obtain multiple third-level partitions based on a communication mode among computing device(s), memories, and processors; and a storage module configured to separately store graph data of the multiple third-level partitions in NUMA nodes corresponding to the processors.

Clause 6: The graph data storage system recited in Clause 5, wherein the partitioning module specifically comprises: partitioning the graph data according to a number of the computing device(s) and a communication overhead between the computing device(s) to obtain multiple first-level partitions; dividing each first-level partition into multiple second-level partitions according to a number of NUMA nodes in each computing device and a communication overhead between NUMA nodes; and dividing each second-level partition into a plurality of third-level partitions according to a number of working nodes in each NUMA node and a communication overhead between each working node, the working node including a processor or a thread on the processor.

Clause 7: The graph data storage system recited in Clause 5, wherein the storage module is further used for: storing content of a first part of the graph data into the memory by way of three-level partitioning of the graph data, wherein the first part includes a graph structure, data, and context; storing content of a second part of the graph data into the memory in an interleaved mode, wherein the processor controls from which NUMA node each memory block is allocated, and the content of the second part of the content includes information; and storing content of a third part of the graph data into the memory in an interleaved mode, where GRAPE controls from which NUMA node each memory block is allocated according to an access frequency and a load balance, and the content of the third part includes a partition table.

Clause 8: An electronic device comprising: multiple processors and multiple memories, wherein the multiple processors and multiple memories adopt a non-uniform memory access architecture (NUMA) mode, the memory store a computer program, and the computer program is executed by the multiple processors, to cause the multiple processors to be enabled to: perform three-level partitioning on graph data to obtain multiple third-level partitions based on a communication mode among computing device(s), memories, and processors; and separately store graph data of the multiple third-level partitions in NUMA nodes corresponding to the processors.

Clause 9: The electronic device recited in Clause 8, wherein performing the three-level partitioning on the graph data to obtain the multiple third-level partitions based on the communication mode among the computing device(s), the memories, and the processors comprises the following steps: partitioning the graph data according to a number of the computing device(s) and a communication overhead between the computing device(s) to obtain multiple first-level partitions; dividing each first-level partition into multiple second-level partitions according to a number of NUMA nodes in each computing device and a communication overhead between NUMA nodes; and dividing each second-level partition into a plurality of third-level partitions according to a number of working nodes in each NUMA node and a communication overhead between each working node, the working node including a processor or a thread on the processor.

Clause 10: The electronic device recited in Clause 8, wherein a specific method of separately storing the graph data of the multiple third-level partitions in the NUMA nodes corresponding to the processors specifically comprises: storing content of a first part of the graph data into the memory by way of three-level partitioning of the graph data, wherein the first part includes a graph structure, data, and context; storing content of a second part of the graph data into the memory in an interleaved mode, wherein the processor controls from which NUMA node each memory block is allocated, and the content of the second part of the content includes information; and storing content of a third part of the graph data into the memory in an interleaved mode, where GRAPE controls from which NUMA node each memory block is allocated according to an access frequency and a load balance, and the content of the third part includes a partition table.

What is claimed is:

1. A method implemented by a system, the method comprising:
   performing three-level partitioning on graph data to obtain multiple third-level partitions based on a communication mode among one or more computing devices, multiple memories, and multiple processors; and
   separately storing graph data of the multiple third-level partitions in non-uniform memory access architecture (NUMA) nodes corresponding to the multiple processors, the separately storing the graph data of the multiple third-level partitions in the NUMA nodes corresponding to the multiple processors comprising:
      storing a content of a first part of the graph data into the memories by way of the three-level partitioning on the graph data, the first part including a graph structure, data, and context; and
      storing a content of a second part of the graph data into the memories in a first interleaved mode, the content of the second part of the graph data being controlled by the multiple processors to control from which NUMA node each memory block is allocated, the content of the second part of the content including information that notifies different third-level partitions needing to synchronize state information; and
      storing a content of a third part of the graph data into the memories in a second interleaved mode different from the first interleaved mode, the content of the third part of the graph data being controlled by a graph computing engine to control from which NUMA node each memory block is allocated according to an access frequency and a load balance, the content of the third part including a partition table.

2. The method recited in claim 1, wherein the performing the three-level partitioning on the graph data to obtain the multiple third-level partitions based on the communication mode among the one or more computing devices, the multiple memories, and the multiple processors comprises:
   partitioning the graph data according to a number of the one or more computing devices and a communication overhead between the one or more computing devices to obtain multiple first-level partitions.

3. The method recited in claim 2, wherein the performing the three-level partitioning on the graph data to obtain the multiple third-level partitions based on the communication mode among the one or more computing devices, the multiple memories, and the multiple processors further comprises:
   dividing each first-level partition into multiple second-level partitions according to a number of NUMA nodes in each computing device and a communication overhead between NUMA nodes.

4. The method recited in claim 3, wherein the performing the three-level partitioning on the graph data to obtain the multiple third-level partitions based on the communication mode among the one or more computing devices, the multiple memories, and the multiple processors further comprises:
   dividing each second-level partition into a plurality of third-level partitions according to a number of working nodes in each NUMA node and a communication overhead between each working node, the working nodes including a processor of the multiple processors or a thread on the processor.

5. The method recited in claim 1, wherein the graph data comprises multiple data blocks, and each data block is alternately stored on a different NUMA node in an interleaved mode.

6. One or more computer readable media storing executable instructions that, when executed by a processing system, cause the processing system to perform acts comprising:
performing three-level partitioning on graph data to obtain multiple third-level partitions based on a communication mode among one or more computing devices, multiple memories, and multiple processors; and
separately storing graph data of the multiple third-level partitions in non-uniform memory access architecture (NUMA) nodes corresponding to the multiple processors, the separately storing the graph data of the multiple third-level partitions in the NUMA nodes corresponding to the multiple processors comprising:
storing a content of a first part of the graph data into the memories by way of the three-level partitioning on the graph data, the first part including a graph structure; and
storing a content of a second part of the graph data into the memories in an first interleaved mode, the content of the second part of the content including information that notifies different third-level partitions needing to synchronize state information.

7. The one or more computer readable media recited in claim 6, wherein the performing the three-level partitioning on the graph data to obtain the multiple third-level partitions based on the communication mode among the one or more computing devices, the multiple memories, and the multiple processors further comprises:
partitioning the graph data according to a number of the one or more computing devices and a communication overhead between the one or more computing devices to obtain multiple first-level partitions; and
dividing each first-level partition into multiple second-level partitions according to a number of NUMA nodes in each computing device and a communication overhead between NUMA nodes.

8. The one or more computer readable media recited in claim 7, wherein the performing the three-level partitioning on the graph data to obtain the multiple third-level partitions based on the communication mode among the one or more computing devices, the multiple memories, and the multiple processors further comprises:
dividing each second-level partition into a plurality of third-level partitions according to a number of working nodes in each NUMA node and a communication overhead between each working node, the working nodes including a processor of the multiple processors or a thread on the processor.

9. The one or more computer readable media recited in claim 6, wherein the first part further includes data, and context.

10. The one or more computer readable media recited in claim 9, wherein the content of the second part of the graph data is controlled by the multiple processors to control from which NUMA node each memory block is allocated.

11. The one or more computer readable media recited in claim 10, wherein the separately storing the graph data of the multiple third-level partitions in the NUMA nodes corresponding to the multiple processors further comprises:
storing content of a third part of the graph data into the memories in another interleaved mode, where from which NUMA node each memory block is allocated is controlled according to an access frequency and a load balance, and the content of the third part includes a partition table.

12. The one or more computer readable media recited in claim 6, wherein the graph data comprises multiple data blocks, and each data block is alternately stored on a different NUMA node in an interleaved mode.

13. An electronic device comprising:
multiple processors; and
multiple memories storing executable instructions that, when executed by the multiple processors, cause the multiple processors to perform acts comprising:
performing three-level partitioning on graph data to obtain multiple third-level partitions based on a communication mode between the multiple memories and the multiple processors; and
separately storing graph data of the multiple third-level partitions in non-uniform memory access architecture (NUMA) nodes corresponding to the multiple processors, the separately storing the graph data of the multiple third-level partitions in the NUMA nodes corresponding to the multiple processors comprising:
storing a content of a first part of the graph data into the memories by way of the three-level partitioning on the graph data, the first part including a graph structure; and
storing a content of a second part of the graph data into the memories in an interleaved mode, the content of the second part of the content including information that notifies different third-level partitions needing to synchronize state information.

14. The electronic device recited in claim 13, wherein the multiple processors and the multiple memories adopt a NUMA mode.

15. The electronic device recited in claim 13, wherein the separately storing the graph data of the multiple third-level partitions in the NUMA nodes corresponding to the processors further comprises:
storing content of a first part of the graph data into the memory by way of the three-level partitioning of the graph data, wherein the first part includes a graph structure, data, and context;
storing content of a second part of the graph data into the memory in an interleaved mode, wherein the processor controls from which NUMA node each memory block is allocated, and the content of the second part of the content includes information; and
storing content of a third part of the graph data into the memory in an interleaved mode, wherein from which NUMA node each memory block is allocated is controlled according to an access frequency and a load balance, and the content of the third part includes a partition table.

16. The electronic device recited in claim 2, wherein the content of the third part of the graph data is controlled by a graph computing engine to control from which NUMA node each memory block is allocated according to the access frequency and the load balance.

17. The electronic device recited in claim 13, wherein the performing the three-level partitioning on the graph data to obtain the multiple third-level partitions based on the communication mode between the multiple memories and the multiple processors comprises:
partitioning the graph data according to a number of one or more computing devices and a communication overhead between the one or more computing devices to obtain multiple first-level partitions.

18. The electronic device recited in claim 17, wherein the performing the three-level partitioning on the graph data to obtain the multiple third-level partitions based on the communication mode between the multiple memories and the multiple processors further comprises:

dividing each first-level partition into multiple second-level partitions according to a number of NUMA nodes in each computing device and a communication overhead between NUMA nodes.

19. The electronic device recited in claim 18, wherein the performing the three-level partitioning on the graph data to obtain the multiple third-level partitions based on the communication mode between the multiple memories and the multiple processors further comprises:

dividing each second-level partition into a plurality of third-level partitions according to a number of working nodes in each NUMA node and a communication overhead between each working node, the working nodes including a processor or a thread on the processor.

20. The electronic device recited in claim 13, wherein the content of the second part of the graph data is controlled by the multiple processors to control from which NUMA node each memory block is allocated, the content of the second part of the content including information that notifies different third-level partitions needing to synchronize state information.

\* \* \* \* \*